United States Patent
Chen et al.

(10) Patent No.: US 6,650,873 B2
(45) Date of Patent: Nov. 18, 2003

(54) TECHNIQUES FOR ADJUSTING PARAMETERS OF A QUICK PAGING CHANNEL BASED ON NETWORK LOAD

(75) Inventors: Jiangxin Chen, San Diego, CA (US); Christopher Riddle, San Diego, CA (US); Serguei Glazko, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 314 days.

(21) Appl. No.: 09/809,836

(22) Filed: Mar. 16, 2001

(65) Prior Publication Data

US 2002/0132586 A1 Sep. 19, 2002

Related U.S. Application Data

(60) Provisional application No. 60/242,032, filed on Oct. 19, 2000.

(51) Int. Cl.[7] .................................................. H04Q 7/20
(52) U.S. Cl. ..................... 455/69; 455/458; 455/574; 455/522; 370/335; 370/329
(58) Field of Search .................. 455/69, 458, 522, 455/574; 370/335, 329, 252, 254, 468, 318; 340/7.23, 7.32

(56) References Cited

U.S. PATENT DOCUMENTS 5,373,506 A * 12/1994 Tayloe et al. ............... 370/311
6,307,846 B1 * 10/2001 Willey ........................ 370/329

FOREIGN PATENT DOCUMENTS

WO     WO 00/57662    * 9/2000         H04Q/7/38

* cited by examiner

*Primary Examiner*—Nay Maung
*Assistant Examiner*—Alan T. Gantt
(74) *Attorney, Agent, or Firm*—Philip R. Wadsworth; Charles D. Brown; Kevin T. Cheatham

(57) ABSTRACT

A wireless communication device performance, such as standby time, is improved by adaptively allocating surplus system resources to change quick paging channel parameters at the system, such a system being for example, a base station. Adaptively adjusting the quick paging channel parameters allows available base station resources to be allocated to the quick paging channel, thereby enabling the wireless communication device to demodulate the quick paging channel more reliably. Parameters such as the number of quick paging channels, the data rate used by the paging channel, and the quick paging channel transmit power level are weighed and adjusted.

12 Claims, 2 Drawing Sheets

TECHNIQUES FOR ADJUSTING PARAMETERS OF A QUICK PAGING CHANNEL BASED ON NETWORK LOAD

CROSS-REFERENCE TO RELATED APPLICATIONS

This application claims the benefit under 35 U.S.C. §119 (e) of the following U.S. provisional application entitled A METHOD OF IMPROVING THE CELLULAR PHONE STANDBY TIME WITH THE SUPPORT OF THE QUICK PAGING CHANNEL IN CDMA, Ser. No. 60/242,032 filed Oct. 19, 2000.

BACKGROUND OF THE INVENTION

1. Field of the Invention

This invention relates to wireless communication systems, and more specifically to a method of adaptively allocating resources at a base station to maximize the wireless communication device standby time in a system using a quick paging channel.

2. Description of the Related Art

FIG. 1 is a block diagram showing a typical modern wireless communication system 10. The system is comprised of several remote stations 12 and a series of base stations 14 (only one is shown). Mobile stations 12, such as personal wireless communication handsets, communicate with the base stations 14 over forward link channels 18 and reverse link channels 20. Forward link channels 18 are structured to consist of traffic channels and overhead channels, including one or more paging channels. A paging channel 22 is used to communicate from the base station 14 to the mobile station 12 when the mobile station 12 is not assigned to a dedicated channel.

Code Division Multiple Access (CDMA) 2000 is a well known standard used in wireless communication systems. In CDMA2000, a quick paging channel (QPCH) 24 contains two-identical-bit messages that direct the mobile stations 12 to monitor their assigned slot on the paging channel 22. Use of the QPCH 24 allows considerable improvements in standby time. In this circumstance, the mobile station 12 only needs to decode the two-identical-bit messages on the QPCH to determine if it needs to receive an incoming page. The QPCH 24 is a new feature in CDMA2000.

The QPCH reduces the amount of time a mobile station is awake. As used herein, a mobile station is awake when it is consuming power from a power source to demodulate a channel using a radio frequency receiver and demodulation hardware. As used herein, the term "wake up" is used to mean activation of, and application of a power source to, hardware necessary for demodulating a paging signal. Similarly the terms "sleep" and "go to sleep" refer to the deactivation of the hardware for the purpose of conserving a power source in the mobile station.

No error correction coding or interleaving is used for the QPCH paging indicator bits. Consequently, the time awake to receive the bits is small compared to the time awake to receive the regular paging channel slot. A pair of QPCH paging indicator bits indicate to the mobile station whether it is to wake up for its paging channel slot to receive a page. On-off keying is used by the base station to transmit the QPCH bits. For example, for one value the base station transmits a spread spectrum signal at a given power level during the bit time period using a particular spreading code and for the other value the base station does not transmit any power during the bit time period using the particular spreading code.

The paging channel 22 and the QPCH 24 are divided into slots. For example, the QPCH is divided into 80 ms slots called QPCH slots. The beginning of a QPCH slot occurs 100 ms earlier in time than the beginning of the associated PCH slot. Each QPCH slot is divided into four 20 ms frames. In a QPCH slot, a mobile station's first paging indicator bit will be in one of the first two 20 ms frames of the QPCH slot. A mobile station's second paging indicator bit will occur in the frame two frames after the frame containing the mobile station's first paging indicator bit. If the mobile station receives two paging indicator bits in a slot commanding the mobile station to wake up, the mobile station will wake up and monitor the paging channel 22.

In conventional IS-95A/B systems, the standby time of the mobile station 12 is independent of the channel condition or the power allocation at the base station 14. On the other hand, the base station 14 can adjust various parameters of the QPCH 24 that have an affect on the ability of the mobile station 12 to demodulate the QPCH 24. For example, the transmission power 26 of the QPCH 24 can be adjusted at the base station 14. CDMA2000 specifies that the QPCH's transmission power 26 relative to the pilot power range from 2 dB to −5 dB.

Also, the number of quick paging channels transmitted by the base station 14 also can be adjusted at the base station 14. CDMA2000 specifies that one to three quick paging channels 24 can be allocated to each supported CDMA channel. The number of quick paging channels 30 influences the probability of a collision occurring. Collisions occur if the QPCH's indicator positions for two mobile stations 12 happen to be the same. In this case, if one of the mobile stations has a page, the base station 14 will send a signal to wake the mobile station 12. Because two mobile stations have the same QPCH indicator positions, both mobile stations 12 will wake up. Additionally, the data rate 28 of the QPCH 24 can be adjusted at the base station 14. CDMA 2000 specifies that the data rate 28 be 4800 bps or 9600 bps. With a higher data rate 28, the base station can transmit more information, therefore there are more QPCH paging indicator positions.

However, there are trade-offs in adjusting the above parameters. Although using a higher data rate 28 reduces the chance of collision, it is well known that using a higher data rate with transmission power remaining the same results in worse performance in demodulation of the QPCH. This can cause an increased number of false page indications, thereby increasing the number of times the mobile station 12 is caused to wake up unnecessarily.

Additionally, one concern with respect to the base station 14 is the available power and transmission capacity of the base station. If more resources are allocated to the QPCH, there will be fewer resources allocated to the forward link traffic channel, which may result in the reduction of total system capacity. When the network load is high, i.e., when there are many active users or a high data rate request, it is likely that the service provider will prefer to provide service to the active users rather than increasing the standby time of the idle users. On the other hand, if the network load is low, the service provider has the ability to allocate more resources to the QPCH 24 while maintaining adequate services for the active users.

What is needed is a method of adaptively adjusting parameters of the QPCH 24 at the base station 14 according to current available network resources to maximize the standby time of the mobile stations 12.

SUMMARY OF THE INVENTION

The invention satisfies the aforementioned needs by providing a method of adaptively allocating network resources to improve performance of a wireless communication device in a system in which a base station transmits a QPCH signal. The method includes identifying at least one parameter of the QPCH signal at the base station, monitoring the network load at the base station; and adaptively adjusting the at least one parameter at the base station based on the network load, such as the QPCH transmission power, to influence the performance of the wireless communication device.

BRIEF DESCRIPTION OF THE DRAWINGS

These and other objects and features of the invention will become more fully apparent from the following description and appended claims taken in conjunction with the following drawings.

DETAILED DESCRIPTION OF THE INVENTION

Figure 1:
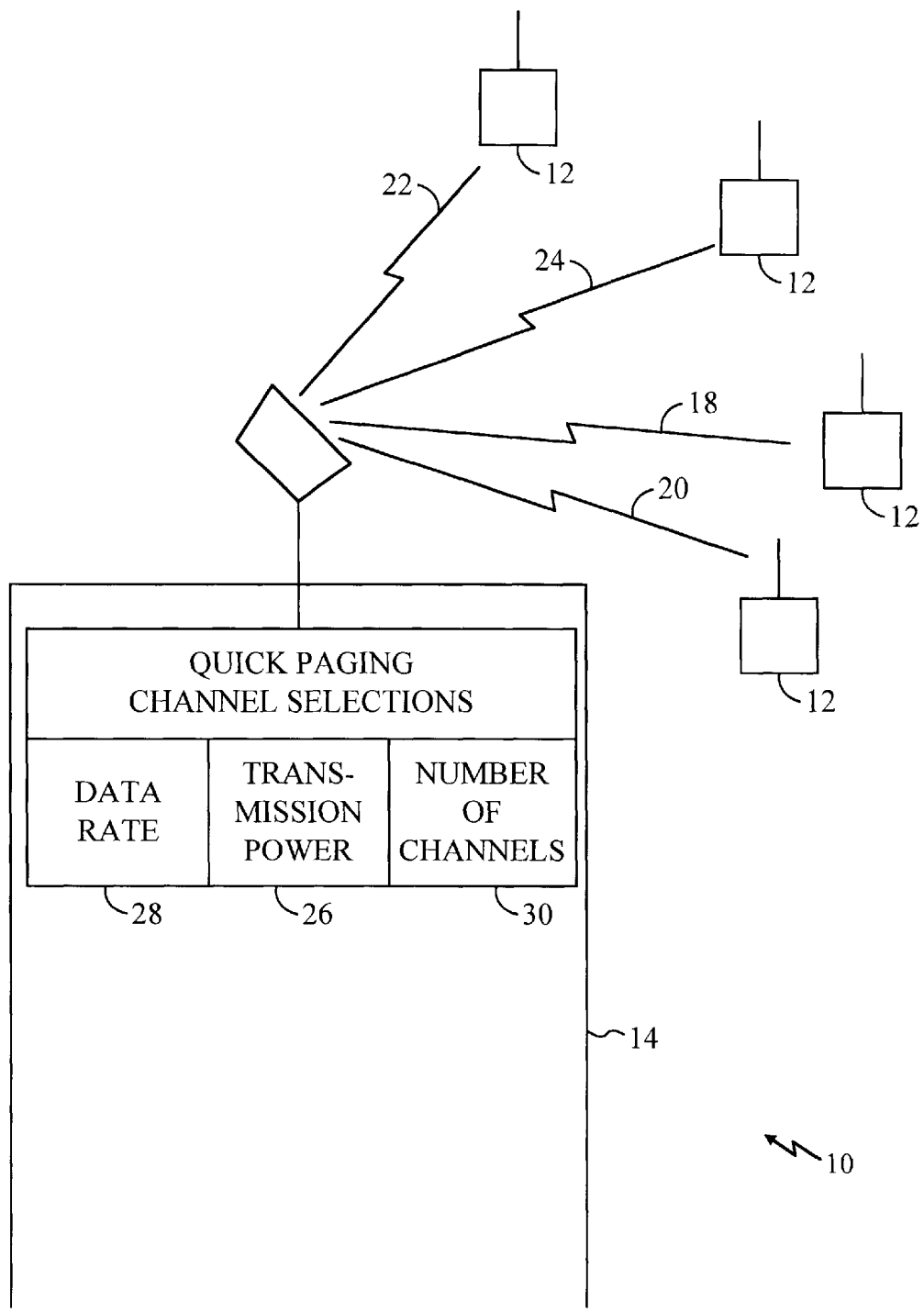
FIG. 1 is a representative block diagram showing a typical modem wireless communication system.

The following presents a detailed description of certain specific embodiments of the invention. However, the invention can be embodied in a multitude of different ways as defined and covered by the claims. In this description, reference is made to the drawings wherein like parts are designated with like numerals throughout Referring again to FIG. 1, it is seen that various parameters of the QPCH 24 can be adaptively adjusted at the base station 14 to allocate resources of the base station 14 and to increase the standby time of the mobile station 12. Higher transmission power 26 results in a stronger signal received at the mobile station 12. The resulting stronger signal received by the mobile station can be demodulated more efficiently than a weak signal produced by base station 14 transmitting at low transmission power. Therefore, a higher transmission power allows better demodulation performance of the QPCH 24 by the mobile station 12. Better demodulation performance translates into longer standby time.

The number of quick paging channels 30 transmitted by a base station 14 also can be adjusted at the base station 14. The number of quick paging channels 30 influences the probability of a collision occurring. In this case, if one of the mobile stations has a page, the base station 14 will send a signal to wake the mobile station 12. Because two mobile stations have the same QPCH indicator positions, both mobile stations 12 will wake up. The mobile station 12 which was inadvertently paged is therefore woken up unnecessarily. Transitioning to an active state increases demand for battery power, which increases the battery power used, thereby reducing the standby time available.

The more users there are on a QPCH 24, the more collisions will likely occur. If the number of quick paging channels 30 is increased, each QPCH 24 will support fewer users and thus the probability of collision will be reduced. Therefore, increasing the number of quick paging channels increases the standby time that can be achieved.

The data rate 28 of the QPCH 24 can be adjusted at the base station 14. It is well known that using a lower data rate with transmission power remaining the same results in better performance in demodulation of the QPCH. The wireless communication device is less likely to wake up falsely with a better performance in the QPCH demodulation, thereby increasing the standby time. However, with a higher data rate 28, the base station can transmit more information, therefore there are more available bit positions, and with more bit positions, there is a reduced probability of collision. With fewer collisions, fewer mobile stations 12 are inadvertently paged, increasing the standby time available. So there is a trade off with the data rate.

The above QPCH 24 parameters can be adaptively adjusted depending on the loading of the network. When the network load is high (i.e., many active users and high data rate requests), the service provider can allocate resources to provide service to the active users instead of increasing the standby time of the idle users. On the other hand, if the network load is low, the service provider can allocate more resources to the QPCH 24 while still maintaining necessary services for the active users. With fewer users in the network, the system provider can use a lower QPCH data rate 28 without incurring an unsatisfactory number of collisions. Also, the system provider can use a higher number of quick paging channels 30 and a higher transmission power 26 without sacrificing power needed for active users.

The QPCH 24 is on-off keying modulated, i.e., if there is a page for a mobile station 12, the QPCH indicators for that mobile station 12 will be set to 1 (on) and the base station 14 will use the pre-determined QPCH transmission power 26 to transmit the indicators. If no page is sent, the corresponding paging indicators will be set to 0 (off) and no power is used when 0 is sent. Thus, although the QPCH power 26 is pre-determined, the actual transmission power for the QPCH 24 is bursty, i.e. either zero if the indictors are 0 or the pre-determined power if the indicators are 1. Power can be allocated conservatively by assuming that the actual QPCH power is the pre-determined power, thereby always satisfying the QPCH power requirement. But this approach wastes significant power capacities since the chance that the all the indicators are 1 or on simultaneously is relatively low.

As one skilled in the art can appreciate, resources can also be allocated with some statistical variations, i.e. try to guarantee that the total required power and the total required channels do not exceed the maximum limit due to system/hardware limitations with probability p. Peak/average transmission power can be collected to aid in this determination.

Figure 2:
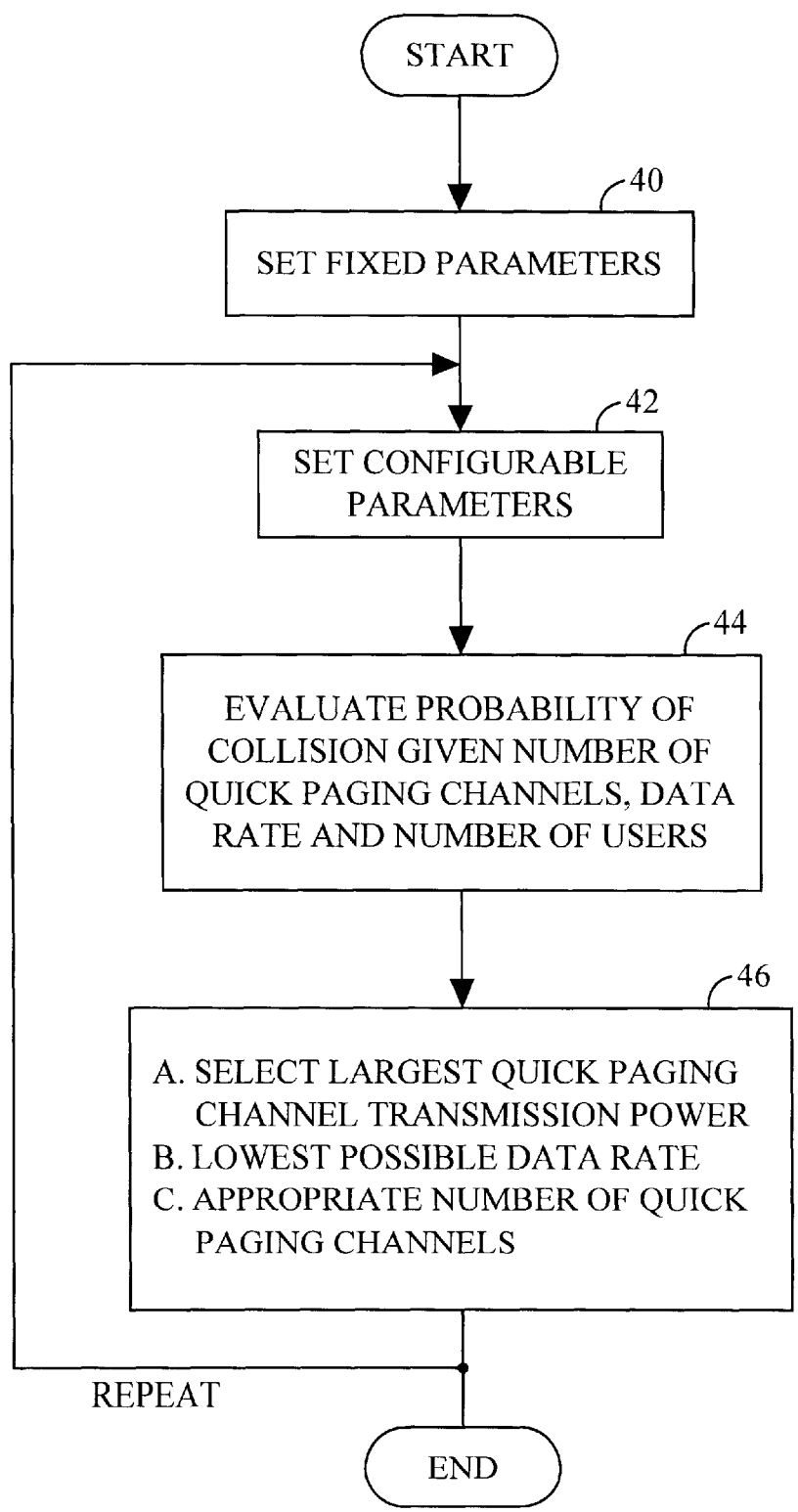
FIG. 2 is a logical flow chart illustrating one exemplary embodiment of a method of allocating network resources in the communication system of FIG. 1 according to an embodiment of the invention.

With reference to FIG. 2, a method of adaptively allocating network resources is described. In a first step 40, the fixed parameters of the system are set. The fixed parameters include any system/hardware limitations related to forward link transmission power and the number of channels available.

In a second step 42, the configurable network load related parameters are set. These parameters may be obtained by real-time measurements. These parameters include current target system capacity, peak/average forward link transmission power of the active users, the number of active users, the number of users to serve in the paging channel(s), and the maximum number of quick paging channels that can be used. Other parameters can conceivably be used.

In a third step 44, the probability of collision is evaluated using well known predicting techniques based on the number of quick paging channels 30 to be used, the data rate 28 of the QPCH, and the number of users to be paged in the paging channel(s).

In a fourth step 46, QPCH parameters, such as QPCH transmission power 26, the data rate 28 and the number of quick paging channels 24 are weighed and selected based on the desired results. In one embodiment, the provider can allocate the available resources such that the standby time of the mobile station 12 is maximized. To maximize the standby time, a combination of a higher QPCH transmission power 26, a lower data rate 28 and a high number of QPCH channels is selected. The parameters are adjusted at the base station to achieve the desired result. The requirements on the system capacity and the limitations on forward link transmission influence this selection process.

For example, the parameters can be selected based on the expected traffic with respect to the time of day, the day of the week, whether it is a holiday, etc. More particularly, during a weekday, when more traffic is anticipated, fewer resources are allocated to the QPCH. In this instance, QPCH transmission power can be selected to be low, such as −5 dB relative to the pilot power range, the data rate can be selected to be high, such as 9600 bps, and the provider can utilize a single QPCH channel. On the other hand, during the night, anticipated use might be lower. For these time periods of low anticipated use, the provider can increase the QPCH transmission power to 2 dB relative to the pilot power range, the data rate can be selected to be low, such as 4800 bps, and the provider can utilize three QPCH channels. The parameters can be weighed and selected periodically, such as twice a day, such that the parameters are adjusted adaptively with respect to the network load changes. Of course, it is anticipated that several variations in the changes to the above parameters are within the scope of this invention. The above selections are merely one example of possible changes.

This method of adaptively adjusting parameters of the QPCH 24 at the base station 14 according to the available network resources increases the performance of the mobile station 12, such as by increasing the standby time. Adaptively adjusting the quick paging channel parameters overcomes the problem of inefficiently using available resources by allowing the resources to be allocated to the quick paging channel, thereby enabling the wireless communication device to demodulate the quick paging channel more reliably.

Specific blocks, sections, devices, functions and modules may have been set forth. However, a skilled technologist will realize that there are many ways to partition the system of the present invention, and that there are many parts, components, modules or functions that may be substituted for those listed above. While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the invention.

What is claimed is:

1. A method of adaptively allocating network resources to improve performance of a wireless communication device in a system in which a base station transmits a quick paging channel signal, the method comprising:
   identifying at least one parameter at the base station relating to the quick paging channel signal, wherein the identified at least one parameter affects the performance of the wireless communication device;
   monitoring network load at the base station; and
   adaptively adjusting the at least one parameter at the base station to modify the quick paging channel signal based on the network load, thereby influencing the performance of the wireless communication device.

2. The method of claim 1, wherein adaptively adjusting the at least one parameter results in increasing the standby time of the wireless communication device.

3. The method of claim 1, wherein the at least one parameter is a number of quick paging channels.

4. The method of claim 1, wherein the at least one parameter is a data rate used by the quick paging channel.

5. The method of claim 1, wherein the at least one parameter is a quick paging channel transmit power level.

6. The method of claim 1, wherein the at least one parameter is adjusted when there is a change in the network resources at the base station.

7. A system adapted to transmit a quick paging signal to a wireless communication device, comprising:
   means for identifying at least one parameter relating to the quick paging channel signal, wherein the identified at least one parameter affects the performance of the wireless communication device;
   means for monitoring network load; and
   means for adaptively adjusting the at least one parameter to modify the quick paging channel signal based on the network load.

8. The system of claim 7, wherein the means for adaptively adjusting the at least one parameter results in increasing the standby time of the wireless communication device.

9. The system of claim 7, wherein the at least one parameter is a number of quick paging channels.

10. The system of claim 7, wherein the at least one parameter is a data rate used by the quick paging channel.

11. The system of claim 7, wherein the at least one parameter is a quick paging channel transmit power level.

12. The system of claim 7, wherein said system is a base station, the at least one parameter being adjusted when there is a change in the network resources at the base station.

* * * * *